– – –
United States Patent [19]

Maguire

[11] 4,437,286

[45] Mar. 20, 1984

[54] MODULAR WALL PANEL FASTENER ASSEMBLY

[75] Inventor: Paul R. Maguire, Los Angeles, Calif.

[73] Assignee: Pleion Corporation, Santa Ana, Calif.

[21] Appl. No.: 351,181

[22] Filed: Feb. 22, 1982

[51] Int. Cl.³ .............................................. E04B 1/38
[52] U.S. Cl. ..................................... 52/506; 52/512;
 411/411; 411/438; 411/392
[58] Field of Search ................. 52/506, 787, 511, 512;
 411/392, 411, 438; 24/150 R, 7, 122 K

[56] References Cited

U.S. PATENT DOCUMENTS

| | | | |
|---|---|---|---|
| 196,621 | 10/1877 | Barion . | |
| 401,084 | 4/1889 | Thomas . | |
| 931,023 | 8/1909 | Albertoni et al. . | |
| 1,108,289 | 8/1914 | Mitchell | 52/506 |
| 2,590,264 | 3/1952 | Meyers | 52/506 X |
| 2,624,087 | 1/1953 | Love, Jr. . | |
| 2,900,697 | 8/1959 | Cuss | 24/221 K |
| 3,237,261 | 3/1966 | Homonoff . | |
| 3,330,012 | 7/1967 | Hart et al. . | |
| 4,211,046 | 7/1980 | Shahan | 52/506 |

FOREIGN PATENT DOCUMENTS

| | | | |
|---|---|---|---|
| 118947 | 3/1970 | Norway | 411/392 |
| 606902 | 8/1948 | United Kingdom | 411/392 |

*Primary Examiner*—John E. Murtagh
*Assistant Examiner*—Kathryn L. Ford
*Attorney, Agent, or Firm*—Jackson, Jones & Price

[57] ABSTRACT

A modular wall panel fastener assembly is provided having a helical penetrating member attached to a mounting base with a annular recess. A grommet member is designed to interface with the penetrating member and to be mounted within the cavity for securing objects to compressible wall panels in a modern office environment.

17 Claims, 5 Drawing Figures

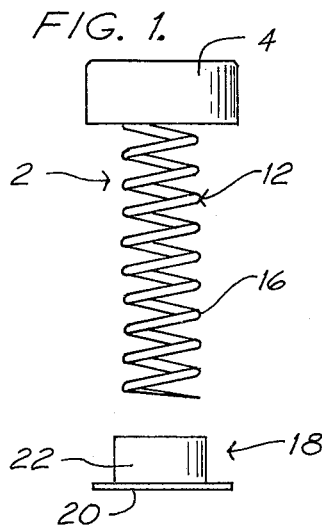
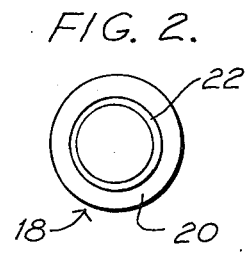
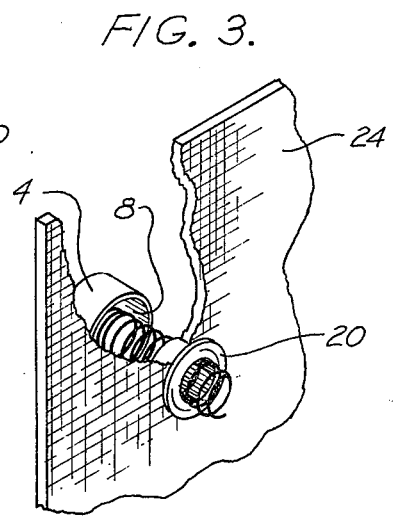
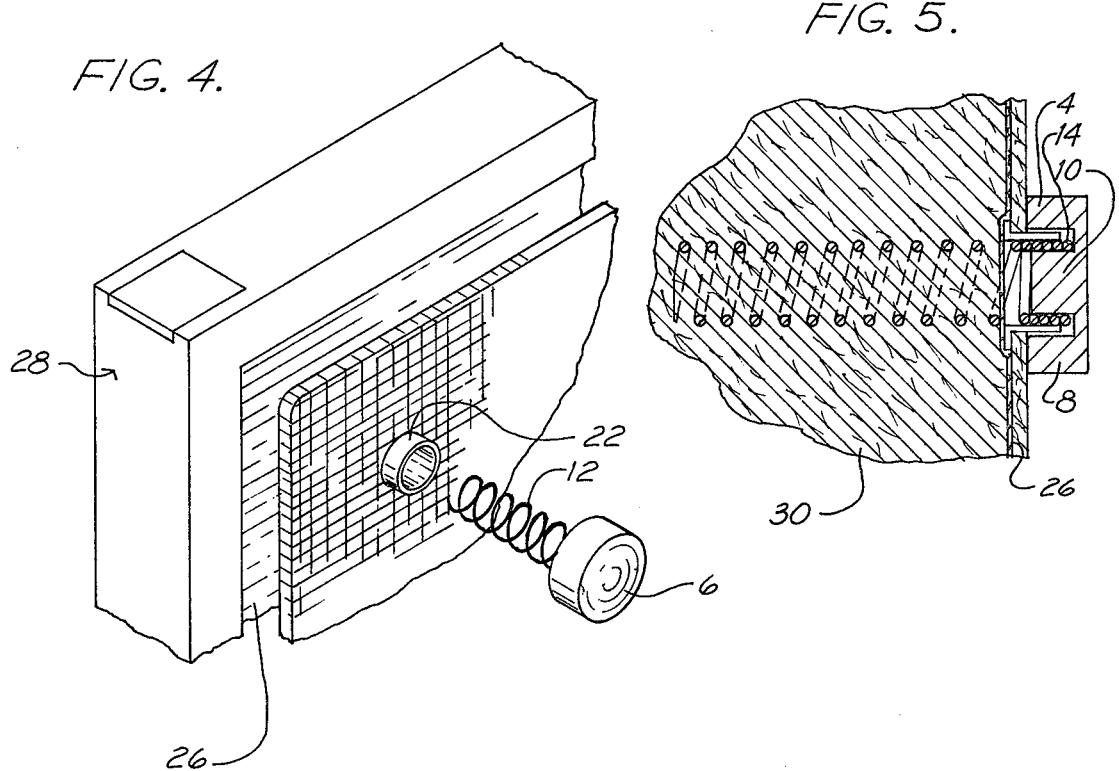

MODULAR WALL PANEL FASTENER ASSEMBLY

BACKGROUND OF THE INVENTION

1. Field of the Invention

The present invention is directed to modular wall panel office systems and more particularly to a modular wall panel fastener assembly.

2. Description of the Prior Art

Today, modern offices are utilizing removable interior wall partitions to accommodate flexible office planning. Many of the new building structures are now being designed to provide permanent load-bearing exterior walls, while relying upon semipermanent or mobile non-load bearing interior partition walls for subjective determination of office floor plans. An example of such mobile wall partitions can be found in the U.S. Pat. No. 3,934,382 and U.S. Pat. No. 4,070,803 which are incorporated herein by reference. In general, these mobile wall partitions include a rigid metal frame, frequently in a box-like configuration, that supports the perimeter of a sound-absorbing panel that can include a sheet or pad of sound-absorbing material (i.e., a sheet of fibrous material such as glass fibers) covered by a decorative exterior cover member usually of a woven fabric structure.

While the modular office system approach is certainly more flexible, it has necessitated certain sacrifices in the office environment since the sound-absorbing panel is generally not capable of supporting additional direct weight without producing tears and damage to the decorative surface. For this reason, the prior art has primarily relied upon a structural modification of the peripheral rigid support frame such as in U.S. Pat. No. 3,477,679 to append items to a modular wall panel. An alternative approach is disclosed in U.S. Pat. No. 4,070,803.

U.S. Pat. No. 3,330,012 discloses a screw-type pin retainer for retaining a device on a fabric or on an upholstered member.

U.S. Pat. No. 3,237,261, U.S. Pat. No. 2,624,087, U.S. Pat. No. 931,023, U.S. Pat. No. 401,084, and U.S. Pat. No. 196,621 are cited simply of general interest in non-analogous fields wherein a helical spring member has been employed.

To date, the prior art has not provided a relatively inexpensive and efficient fastening system for appending accesory items directly to the sound-absorbing panels of modular wall partitions.

SUMMARY OF THE INVENTION

The present invention is directed to a modular wall panel fastener assembly that can be used in combination with a compressible panel member of a modular wall partition. Generally, the compressible panel members comprise a resilient fibrous material such as a glass fiber pad covered with a woven fabric exterior cover. The present invention is capable of penetrating the woven fabric exterior cover with a minimum of damage while securely maintaining an accessory unit such as tack boards, writing boards, etc. that are frequently found within an office environment. The accessory unit may be provided with at least one hole extending through the accessory unit to receive an open loop helical member having a sharp tip. The design of the tip is such that it can penetrate through the woven fabric with minimal damage. When the fastener member is subsequently removed, no damage is perceivable. The helical member is attached to a cylindrical mounting base member having on one surface a concentric groove that surrounds a mounting post. The helical loop member extends a distance not greater than the thickness of a modular wall panel. A grommet member is positioned around the helical member and between the mounting base member and the accessory unit. Preferably, a flange is provided on the grommet member to bear directly against the woven fabric surface, thereby minimizing any damage to the cover member. Rotation of the mounting base member will cause the open loop helical member to progressively penetrate into the fibrous material and to firmly secure the accessory unit.

The features of the present invention which are believed to be novel are set forth with particularity in the appended claims. The present invention, both as to its organization and manner of operation, together with further objects and advantages thereof, may best be understood by reference to the following description, taken in connection with the following drawings.

BRIEF DESCRIPTION OF THE DRAWINGS

FIG. 1 is a side perspective view of the fastening member and grommet of the present invention;

FIG. 2 is a planned view of the grommet member;

FIG. 3 is a partial perspective view of the present invention;

FIG. 4 is another partial perspective view of the present invention; and

FIG. 5 is a cross-sectional view of the present invention in combination with a modular wall panel and an accessory unit.

DESCRIPTION OF THE PREFERRED EMBODIMENT

The following specification, taken in conjunction with the drawing, sets forth the preferred embodiment of the present invention in such a manner that any person skilled in the modular wall panel field can use the invention. The embodiment of the invention disclosed herein is the best mode contemplated by the inventor for carrying out his invention in a commercial environment, although it should be understood that various modifications can be accomplished within the parameters of the present invention.

Referring to the side perspective view of FIG. 1, the modular wall panel fastener assembly 2 of the present invention is disclosed. A helical fastener 12 is designed to penetrate a fibrous wall panel. A mounting base or a head member 4 is attached to the fastener 12 and can be formed of a metal material such as aluminum, with a decorative baked enamel surface coating to compliment the particular decor of the office environment. Alternatively, the mounting base could be molded from a plastic material. The mounting base 4 is preferably formed of a cylindrical configuration having a flat outer surface 6 and an interior surface with a concentric groove 8. Mounted within the concentric groove 8 is a mounting post 10 also preferably of a circular configuration. A helical member 12 is securely fastened onto the mounting post 10 by a closed-looped configuration 14 adjacent to the mounting post 10. An adhesive, such as LOCTITE 430, can be preapplied to the close-looped configuration of the helical member 12 before assembly to supplement the frictional fit with the mounting post 10. The helical member 12 extends from the mounting post 10 in an open-looped configuration having a pitch of approximately six turns per inch. The closed-loop configuration, in comparison, has a pitch of approximately fifteen turns per inch. The open-looped configuration 16 terminates in a sharp point designed to penetrate fabric with minimal damage. The closed coil end of the helical member 12 is cut and ground square to provide a flush mounting at the bottom of the concentric groove 8. The helical member 12 can be formed from a 0.064-inch-diameter music wire having a cadmium finish. The length of the open-looped configuration is approximately two inches with the closed-loop configuration being approximately 0.4 inches. The outer diameter of the open coils is approximately one-half inch.

A flanged bushing or grommet 18 can be formed of a material such as Nylon or Teflon. The grommet 18 includes a flanged surface 20 and a cylindrical projection 22. Extending through the grommet 18 is an opening or bore 24 of approximately 0.515 inches inside diameter. An exterior surface of 0.635 inches outer diameter is provided on the grommet 18 in the form of a cylindrical projection. The flange 20 has an outer diameter of approximately 0.875 inches. The width of the concentric groove 8 and its depth is sufficient to accommodate the insertion of cylindrical projection 22. The total height of the grommet 18 is approximately 0.620 inches.

Referring to FIG. 3, the fastener 2 is shown extending through an accessory unit 24 such as a cork or tack board. A hole or bore in the accessory unit 24 receives the grommet 18 with the flange 20 on the surface adjacent the fabric covering 26 of a modular wall panel 28.

With the flange 20 positioned between the rear surface of the accessory unit 24 and the fabric covering 26, any relative movement between the helical fastener 12 and the covering 26 will be minimized and the tendency to tear or pull the weave will be substantially eliminated.

As shown in FIG. 4, the cylindrical projecting member 22 of the grommet 18 can act as a guide during the insertion of the helical fastener 12.

Finally, as shown in FIG. 5, the spaced open coil portion of the helical fastener 12 is disclosed fully inserted into the fibrous pad 30 and the accessory unit 24 is firmly attached to the fibrous pad 30. The projection of a portion of the cylindrical projecting member 22 of the grommet 18 into the mounting head 4 further provides extra stability to the mounting of the accessory unit.

The present invention accordingly includes a helical fastener with the unique mounting head that is capable of co-acting with a specially designed grommet member to provide a fastener assembly that is capable of meeting the demands and needs of a modern modular panel office system. A person skilled in this field, once informed of the specifics of the present invention, would be capable of various modifications within the spirit of the present invention.

Accordingly, the scope of the present invention should be measured solely from the following claims wherein I claim:

1. A modular wall panel fastener assembly for securing accessory items to a fibrous compressible panel member with a flexible cover comprising:
   a mounting base having a cavity;
   an open loop helical penetrating member secured at one end to, and extending from, the mounting base cavity to terminate in a relatively sharp tip for penetrating the flexible cover of the panel member with a minimum of damage, the loops of the helical member being embedded in the fibrous panel member; and
   a grommet member having a base with an opening and a hollow tubular projecting member extending from the base to provide an opening extending through the grommet member, the projecting member is of a configuration that is capable of extending within the mounting base cavity depending on the thickness of the accessory item, the penetrating member being diametrically smaller than the tubular projecting member and rotatable relative therein for a guiding insertion through the grommet member opening into the panel member.

2. The invention of claim 1 wherein the penetrating member is a helical spring-like member.

3. The invention of claim 2 wherein a post member is positioned within the mounting cavity to secure the helical spring-like member.

4. The invention of claim 3 wherein the grommet projecting member has a cylindrical shape and is formed from a plastic resin material.

5. The invention of claim 3 wherein the helical spring-like member has a closed-loop configuration adjacent the post member and a spaced loop configuration otherwise.

6. The invention of claim 5 wherein the helical spring-like member is adhered to the post member with an adhesive.

7. The invention of claim 5 wherein the mounting base has a cylindrical exterior configuration with one end of the cylinder having a concentric groove to form the cavity around the post member.

8. In a combination of a modular wall panel having a rigid frame for supporting a compressible panel member of a resilient fibrous material covered with a woven fabric exterior cover and an accessory unit suspended directly from the panel member, the improvement comprising:
   at least one hole extending through the accessory unit;
   a mounting base member having on one surface a concentric groove;
   a post member attached to the base member and surrounded by the concentric groove;
   an open-loop helical member attached at one end to the post member and extending therefrom through the accessory unit hole and the woven fabric exterior cover and terminating in a sharp tip positioned within the fibrous material, the loops of the helical member being thereby embedded in the fibrous material to secure the mounting base member; and
   a grommet member positioned around the helical member to guide it during insertion into the exterior cover and fibrous material for securement of the mounting base member and the accessory unit.

9. The invention of claim 8 wherein the grommet member includes a flange and a hollow cylindrical projection, the hollow cylindrical projection extending through the accessory hole and the flange contacting the woven fabric exterior cover.

10. The inventions of claim 9 wherein the helical spring-like member has a closed loop configuration adjacent the post member and a spaced-loop configuration into the fibrous material.

11. In a combination of a modular wall panel having a rigid frame for supporting a compressible panel member of a resilient fibrous material covered with a woven fabric exterior cover and an accessory unit suspended directly from the panel member, the improvement comprising:
  at least one hole extending through the accessory unit;
  a mounting base member having on one surface a post member attached to the base member;
  an open-loop helical member attached at one end to the post member and extending therefrom through the accessory unit hole and the woven fabric exterior cover and terminating in a sharp tip positioned within the fibrous material, the loops of the helical member being thereby embedded in the fibrous material to secure the mounting base member; and
  a grommet member positioned around the helical member to guide it through the accessory unit during the insertion into the panel member.

12. The invention of claim 11 wherein the penetrating member is a helical spring-like member.

13. The invention of claim 12 wherein the helical spring-like member is adhered to the post member with an adhesive.

14. The invention of claim 12 wherein a post member is positioned within the mounting cavity to secure the helical spring-like member.

15. The invention of claim 13 wherein the mounting base has a cylindrical exterior configuration with one end of the cylinder having a concentric groove to form a cavity around the post member.

16. The invention of claim 13 wherein the grommet projecting member has a cylindrical shape and is formed from a plastic resin material.

17. The invention of claim 13 wherein the helical spring-like member has a closed-loop configuration adjacent the post member and a spaced loop configuration otherwise.

* * * * *